United States Patent
Poon

(10) Patent No.: US 7,561,186 B2
(45) Date of Patent: Jul. 14, 2009

(54) MOTION BLUR CORRECTION

(75) Inventor: Eunice Poon, Scarborough (CA)

(73) Assignee: Seiko Epson Corporation, Tokyo (JP)

( * ) Notice: Subject to any disclaimer, the term of this patent is extended or adjusted under 35 U.S.C. 154(b) by 1027 days.

(21) Appl. No.: 10/827,394

(22) Filed: Apr. 19, 2004

(65) Prior Publication Data
US 2005/0231603 A1      Oct. 20, 2005

(51) Int. Cl.
*H04N 5/228* (2006.01)
*G06K 9/40* (2006.01)

(52) U.S. Cl. ............... 348/208.99; 382/254; 382/255; 382/264

(58) Field of Classification Search ........... 382/254, 382/255, 264; 348/208.99
See application file for complete search history.

(56) References Cited

U.S. PATENT DOCUMENTS

| | | | |
|---|---|---|---|
| 3,627,920 A * | 12/1971 | Schroeder et al. ............ | 382/112 |
| 5,241,608 A | 8/1993 | Fogel | |
| 5,420,971 A | 5/1995 | Westerink et al. | |
| 5,629,988 A | 5/1997 | Burt et al. | |
| 5,751,376 A | 5/1998 | Hirai | |
| 6,317,506 B1 | 11/2001 | Helbig et al. | |
| 6,441,848 B1 | 8/2002 | Tull | |
| 6,570,624 B2 | 5/2003 | Cornog et al. | |
| 6,580,812 B1 | 6/2003 | Harrington | |
| 6,665,450 B1 | 12/2003 | Cornog et al. | |
| 2001/0021224 A1 | 9/2001 | Larkin et al. | |
| 2003/0011717 A1 | 1/2003 | McConica | |
| 2004/0081335 A1 | 4/2004 | Kondo et al. | |

FOREIGN PATENT DOCUMENTS

WO      WO 2004/001667 A2      12/2003

OTHER PUBLICATIONS

Identification of Blur Parameters from Motion Blurred Images by Y. Yitzhaky and N. S. Kopeika Graphical Models and Image Processing vol. 59, No. 5, September, pp. 310-320, 1997.*
Direct method for restoration of motion-blurred images by Y.Yitzhaky, I. Mor, A. Lantzman, and N. S. Kopeika J. Opt. Soc. Am A/vol. 15, No. 6/Jun. 1998.*
Local Scale Control for Edge Detection and Blue Estimation by James Elder and Steven Zucker IEEE Transactions on Pattern Analysis and Machine Intelligence vol. 20, No. 7, Jul. 1998.*

(Continued)

*Primary Examiner*—Bhavesh M Mehta
*Assistant Examiner*—Michael Vanchy, Jr.

(57) ABSTRACT

A method and apparatus of correcting blur in a motion blurred image includes estimating the direction of blur in the motion blurred image based on edge response of the motion blurred image over a set of discrete directions and over subgroups of the discrete directions. The extent of blur in the motion blurred image is also estimated. An initial guess image based on the motion blurred image is generated and the guess image is blurred as a function of the estimated blur direction and blur extent. The blurred guess image is compared with the motion blurred image to generate an error image. The error image is blurred and weighted and then combined with the initial guess image thereby to update the guess image and correct for blur.

10 Claims, 7 Drawing Sheets

OTHER PUBLICATIONS

"Identification of Motion Blur For Blind Image Restoration", Y. Yitzhaky and N.S. Kopeika, Ben-Gurion University of the Negev, Department of Electrical and Computer Engineering, (pp. 1-5) 59 (5):310-320. 1997.

"Iterative Methods for Image Deblurring", Jan Biemond, Reginald L. Lagendijk, Russell M. Mersereau, Proceedings of the IEEE, vol. 78, No. 5, May 1990 (pp. 856-883).

"Comparison of Direct Blind Deconvolution Methods for Motion-Blurred Images", Yitzhak Yitzhaky, Ruslan Milberg, Sergei Yohaev, and Norman S. Kopeika, Jul. 10, 1999/vol. 38, No. 20/Applied Optics, (pp. 4325-4332).

* cited by examiner

202

| -1 | 0 | 1 |
|----|---|---|
| -2 | 0 | 2 |
| -1 | 0 | 1 |

| -1 | -2 | -1 |
|----|----|----|
| 0  | 0  | 0  |
| 1  | 2  | 1  |

Fig. 5b

Case I: $\mu_1 \leq \mu_2$         Case II: $\mu_1 > \mu_2$

MOTION BLUR CORRECTION

FIELD OF THE INVENTION

The present invention relates generally to image processing, and more particularly to a method and apparatus for reducing motion blur in an image and to a method and apparatus for estimating blur direction in a motion blurred image.

BACKGROUND OF THE INVENTION

Motion blur is a well-known problem in the imaging art that may occur during image capture using digital video or still-photo cameras. Motion blur is caused by camera motion, such as vibration, during the image capture process. It is somewhat rare to have a priori measurements of actual camera motion when motion blur occurs and as such, techniques have been developed to correct for motion blur in captured images.

For example, blind motion blur correction is a known technique for correcting motion blur in captured images. This technique corrects motion blur based on attributes intrinsic to the captured motion blurred image. Blind motion blur correction seeks to estimate camera motion parameters based on the captured image and then to employ the estimated camera motion parameters to at least partially reverse the effects of the motion blur in the captured image.

The process of estimating camera motion parameters is typically simplified by assuming camera motion has occurred linearly, and at a constant velocity. During camera motion parameter estimation, the linear direction of camera motion (i.e. the blur direction) is firstly estimated followed by the extent of the camera motion (i.e. the blur extent). The publication entitled "Comparison of direct blind deconvolution methods for motion-blurred images" authored by Yitzhaky et al. (Optical Society of America, 1999), discloses a method for estimating linear blur direction. During this linear blur direction estimation method, the direction in which a blurred image's resolution has been maximally decreased is found and is declared as the blur direction. This is achieved by high-pass filtering the blurred image in a number of directions and determining the direction, which yields the lowest intensity. This blur direction estimation technique unfortunately suffers disadvantages in that it is useful generally only in situations where sufficient edge information is available in each of the measured directions. For instance, this blur direction estimation technique may incorrectly declare the measured direction having the lowest intensity after high-pass filtering to be the blur direction in the situation where the low intensity is a result of scarce edge information in the original, unblurred image and not due to blur. Furthermore, this blur direction estimation technique is very sensitive to errors due to noise, which may in any particular direction tend to either sharpen or soften edges.

With the blur direction determined, the blur extent is then estimated typically using a correlation-based method thereby to complete the camera motion parameter estimation process.

Once the camera motion parameters (i.e. the blur direction and blur extent) have been estimated, blur correction is effected using the estimated camera motion parameters to reverse the effects of camera motion and thereby blur correct the image. The publication entitled "Iterative Methods for Image Deblurring" authored by Biemond et al. (Proceedings of the IEEE, Vol. 78, No. 5, May 1990), discloses an inverse filter technique to reverse the effects of camera motion and correct for blur in a captured image. During this technique, the inverse of a motion blur filter that is designed according to the estimated camera motion parameters is applied directly to the blurred image.

Unfortunately, the Biemond et al. blur correction technique suffers disadvantages. Convolving the blurred image with the inverse of the motion blur filter can lead to excessive noise magnification. Furthermore, with reference to the restoration equation disclosed by Biemond et al., the error contributing term having positive spikes at integer multiples of the blurring distance is amplified when convolved with high contrast structures such as edges in the blurred image, leading to undesirable ringing. Ringing is the appearance of haloes and/or rings near sharp objects in the image and is associated with the fact that de-blurring an image in an ill-conditioned inverse problem. The Biemond et al. publication reviews methods for reducing the ringing effect based on the local edge content of the image, so as to regulate the edgy regions less strongly and suppress noise amplification in regions that are sufficiently smooth. However, with this approach, ringing noise may still remain in local regions containing edges.

Various techniques that use an iterative approach to generate blur corrected images have also been proposed. Typically during these iterative techniques, a guess image is motion blurred using the estimated camera motion parameters and the guess image is updated based on the differences between the motion blurred guess image and the captured blurred image. This process is performed iteratively until the guess image is sufficiently blur corrected. Because the camera motion parameters are estimated, blur in the guess image is reduced during the iterative process as the error between the motion blurred guess image and the captured blurred image decreases to zero. The above iterative problem can be formulated as follows:

$$l(x,y)=h(x,y)*O(x,y)+n(x,y)$$

where:
 l(x,y) is the captured motion blurred image;
 h(x,y) is the motion blurring function;
 O(x,y) is an unblurred image corresponding to the motion blurred image l(x,y);
 n(x,y) is noise; and
 A*B denotes the convolution of A and B.

As will be appreciated from the above, the goal of image blur correction is to produce an estimate (restored) image O'(x,y) of the unblurred image, O(x,y), given only the captured blurred image, l(x,y). In the correction algorithm, h(x,y) is assumed to be known from the camera motion parameters. If noise is ignored, the error E(x,y) between the restored image, O'(x,y), and the unblurred image, O(x,y), can be defined as:

$$E(x,y)=l(x,y)-h(x,y)*O'(x,y)$$

While iterative methods such as that described above provide some advantage over direct reversal of blur using motion blur filters, these known iterative methods are still often subject to overcorrection in some areas of the image, leading to non-uniform results and significant ringing. As will be appreciated improvements in blur correction are desired.

It is therefore an object of the present invention to provide a novel method and apparatus for reducing motion blur in an image and to a method and apparatus for estimating blur direction in a motion blurred image.

SUMMARY OF THE INVENTION

According to one aspect of the present invention, there is provided a method of correcting blur in a motion blurred image using an estimate of motion blur direction and motion blur extent based on the motion blurred image. During the method, an initial guess image is generated based on the motion blurred image. The guess image is blurred as a function of the estimated blur direction and blur extent. The blurred guess image is compared with the motion blurred image to generate an error image. The error image is blurred and weighted and combined with the initial guess image thereby to update the guess image and correct for blur.

In one embodiment, the weighting is a function of the blur direction and in particular is an estimate of the edge magnitude of the guess image in the blur direction. The blurring, comparing, blurring and weighting, and combining are performed iteratively. In one embodiment, iterations are performed a threshold number of times. In another embodiment, the iterations are performed until the magnitude of the error image falls below a threshold level. In yet another embodiment, iterations are performed until the error image fails to change by more than a threshold amount between successive iterations. The blur extent is compared with a threshold blur extent level. The method is performed only when the estimate of the motion blur extent is greater than the threshold blur extent level.

According to another aspect of the present invention, there is provided a method of correcting blur in a motion blurred image. The direction of blur in the motion blurred image is estimated based on edge response of the motion blurred image over a set of discrete directions and over subgroups of discrete directions. The extent of blur in the motion blurred image is also estimated. An initial guess image based on the motion blurred image is generated and the guess image is blurred as a function of the estimated blur direction and blur extent. The blurred guess image is compared with the motion blurred image to generate an error image. The error image is blurred and is then combined with the initial guess image thereby to update the guess image and correct for blur.

The set of discrete sample directions includes N discrete directions with the discrete directions being angularly spaced over the angular space of the motion blurred image between 0 and 180°. During blur direction estimation, the edge response over a plurality of subgroup combinations of discrete directions is determined and compared with the edge response over the set of discrete directions. Each subgroup combination partitions the set of discrete directions into a pair of quadrants, with discrete directions in at least one of the quadrants being consecutive. For each subgroup combination, the deviation between the edge response of the motion blurred image over the set of discrete directions and the edge response of the motion blurred image over the discrete directions in each of the quadrants is determined. For the subgroup combination yielding the highest deviation, the direction that bisects the one quadrant is declared as the blur direction when the edge response over the discrete directions in the one quadrant is greater than the edge response over the discrete directions in the other quadrant. Otherwise, the direction normal to the direction that bisects the one quadrant is declared as the blur direction.

In accordance with yet another aspect of the present invention, there is provided a method of estimating blur direction in a motion blurred image. The deviation between the edge response of the motion blurred image over a set of discrete spaced directions extending through the motion blurred image and the edge response of the motion blurred image over possible subgroup combinations of discrete directions in the set are determined. Each subgroup combination includes a pair of quadrants with one quadrant comprising a plurality of consecutive discrete directions. For the subgroup combination yielding the highest deviation, the direction that bisects the one quadrant is declared as the blur direction when the edge response over the discrete directions in the one quadrant is greater than the edge response over the discrete directions in the other quadrant. Otherwise, the direction normal to the direction that bisects the one quadrant is declared as the blur direction.

In accordance with yet another aspect of the present invention, there is provided an apparatus for estimating blur direction in a motion blurred image. The apparatus includes an edge detector determining the edge response through the motion blurred image along a plurality of different discrete directions forming a set. A deviation determinor determines the deviation between the edge response of the motion blurred image over the set of discrete spaced directions and the edge response of the motion blurred image over possible subgroup combinations of the set. A comparator determines the subgroup combination yielding the highest deviation. The comparator for that determined subgroup combination declares the direction that bisects the one quadrant as the blur direction when the edge response over the discrete directions in the one quadrant is greater than the edge response over the discrete directions in the other quadrant. Otherwise, the comparator declares the direction normal to the direction that bisects the one quadrant as the blur direction.

According to still yet another aspect of the present invention, there is provided an apparatus for correcting blur in a motion blurred image using an estimate of motion blur direction and motion blur extent based on the motion blur image. The apparatus includes a motion blur filter blurring an initial guess image based on the motion blurred image as a function of the estimated blur direction and blur extent. A comparator compares the blurred guess image with the motion blurred image and generates an error image. The motion blur filter further blurs the error image and weights the error image according to an error weighting factor. An adder combines the error image and the initial guess image thereby to update the guess image and correct for blur.

The present invention provides advantages in that since the total edge response over all of the discrete directions and over subgroups of the discrete directions are taken into account during blur direction determination, undesirable effects due to anomalies in a particular direction resulting from noise and/or insufficient edge information are dampened. As a result, the likelihood of declaring an inaccurate blur direction is significantly reduced as compared to prior art blur direction estimation techniques.

The present invention also provides advantages in that since blur correction is weighted using a factor that is based on blur direction, unnecessary correction and overcorrection is reduced thereby to avoid the effects of ringing.

BRIEF DESCRIPTION OF THE DRAWINGS

Embodiments of the present invention will now be described more fully with reference to the following drawings, in which:

FIG. 5a shows a high-pass filter matrix used for determining the edge response of an image in the x direction;

FIG. 5b shows a high-pass filter matrix used for determining the edge response of an image in the y direction;

DETAILED DESCRIPTION OF THE EMBODIMENT

Figure 1:
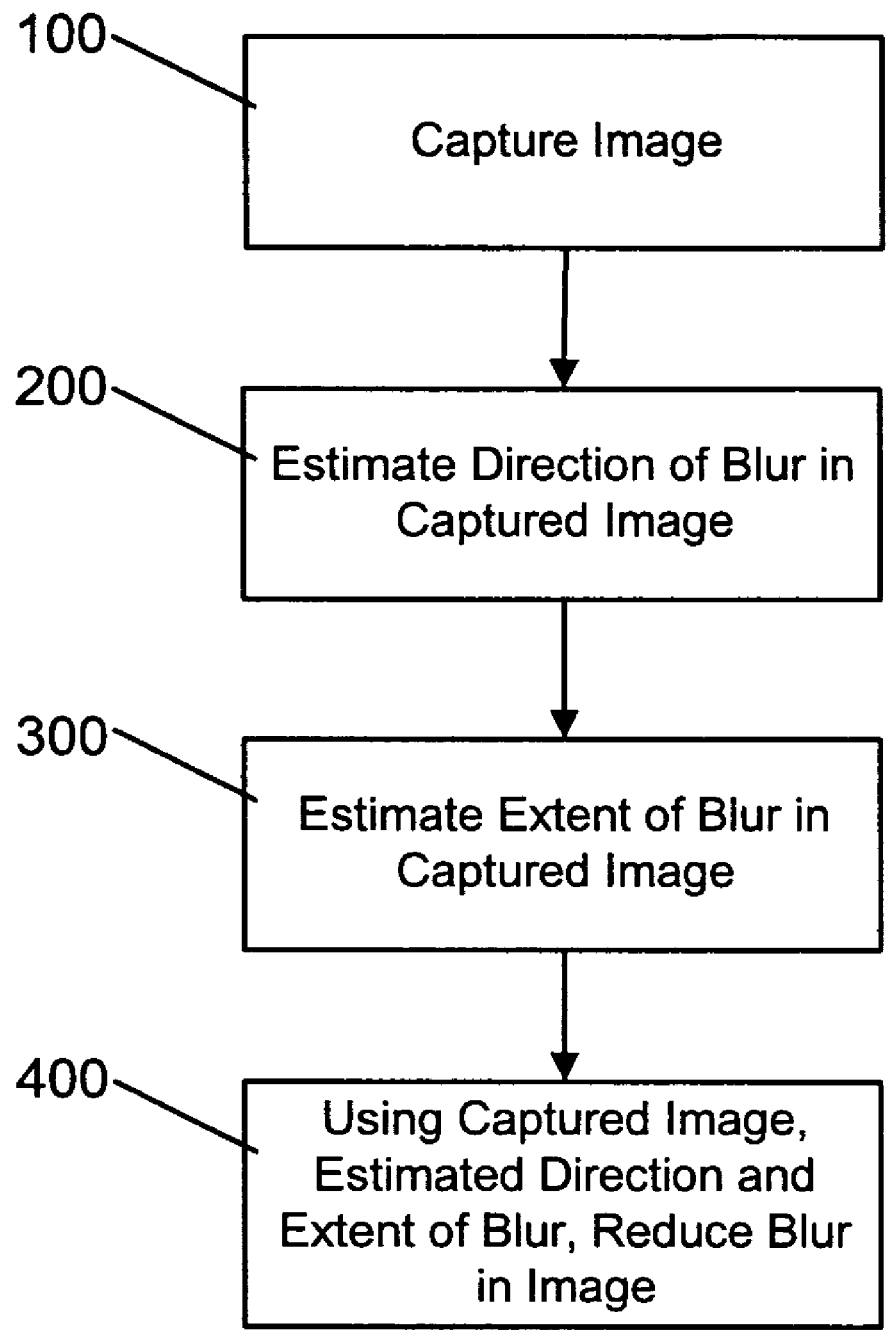
FIG. 1 is a flow chart showing the general steps performed during correction of motion blur in a captured image.

Turning now to FIG. 1, a method of correcting motion blur in an image captured by a digital camera, digital video camera or the like is shown. During the method, when a motion blurred image is captured (step 100), the direction of blur in the captured image is initially estimated using edge information in the captured image (step 200). Once the blur direction is estimated, the extent of blur in the captured image is estimated using a correlation-based technique (step 300). With the estimated motion blur parameters (i.e. the estimated blur direction and blur extent) determined, the estimated motion blur parameters are used to reduce motion blur in the captured image (step 400) thereby to generate a motion blur corrected image.

Figure 2:
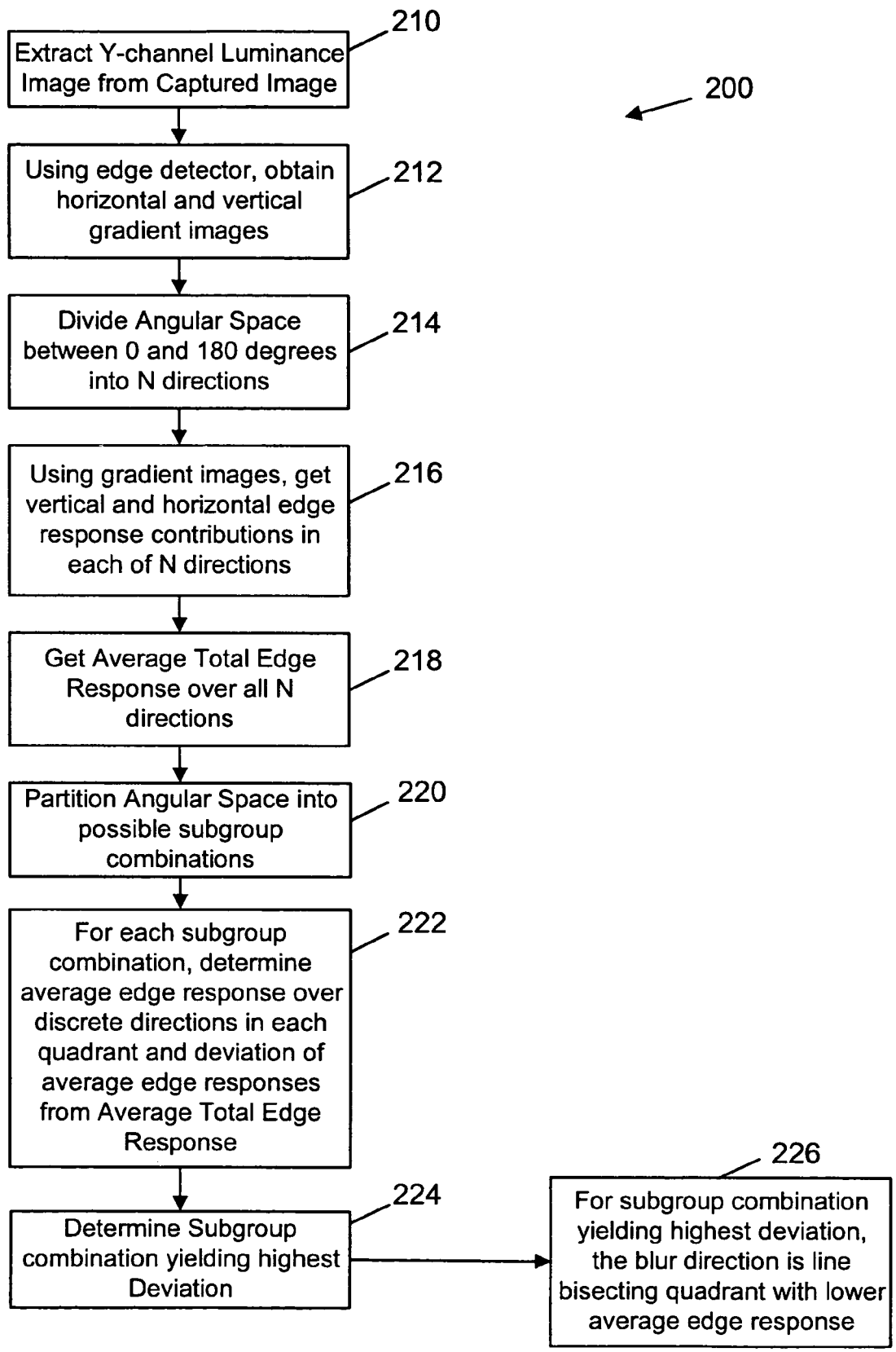
FIG. 2 is a flow chart showing the steps performed during blur direction estimation.
Figures 5A, 5B:
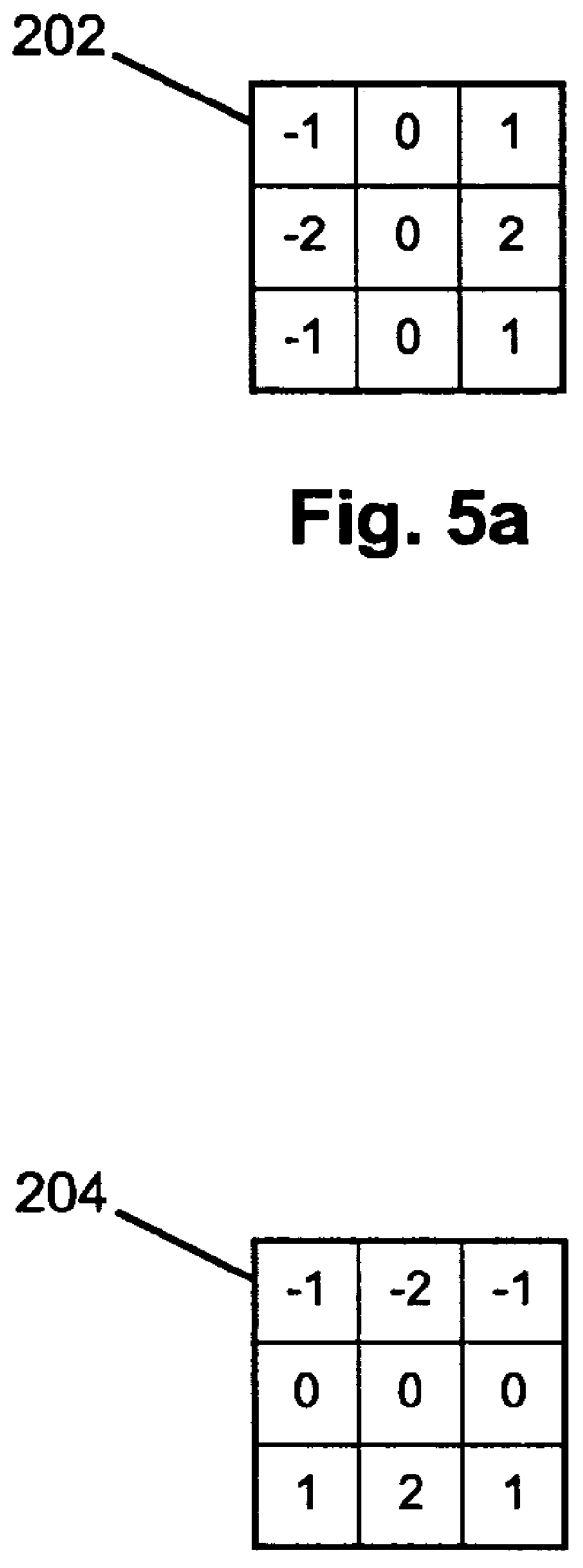

FIG. 2 illustrates the steps performed during blur direction estimation (step 200). Initially, a Y-channel luminance image is extracted from the captured motion blurred image (step 210). The extracted image is then convolved with a Sobel edge detector in order to obtain horizontal and vertical gradient images Gx and Gy, respectively (step 212). The Sobel edge detector is a known high-pass filter suitable for use in determining the edge response of an image and makes use of high-pass filter matrices to detect edge responses of an image in x and y directions. FIG. 5a shows the high pass filter matrix 202 used by the Sobel edge detector for detecting the edge response of an image in the x direction, and FIG. 5b shows the high pass filter matrix 204 used by the Sobel edge detector for detecting the edge response of an image in the y direction.

Figure 6A:
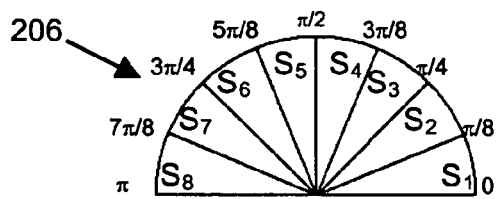
FIG. 6a shows the division of the angular space of an image between 0 and 180 degrees into a plurality of equal sectors along N=8 discrete directions.

Following step 212, the angular space of the image between [0, π) is divided into sectors along N discrete directions $\{\theta_1, \ldots, \theta_N\}$ where $\Delta_\theta = \pi/N$ and $\theta_n = n \cdot \Delta_\theta$ (step 214). The N discrete directions in the set are equi-angularly spaced and thus, divide the angular space of the image into a plurality of identical sectors. FIG. 6a shows a sample discretization of the angular space 206 of an image for N=8. As can be seen, the angular space 206 is divided into equal sectors $S_1$ to $S_8$ by the eight (8) discrete directions.

For each discrete direction, the total edge response E(n) through the captured image is measured (step 216) using the horizontal and vertical gradient images according to the equation:

$$E(n) = \sum_y \sum_x [\cos\theta_n \cdot Gx(x, y) + \sin\theta_n \cdot Gy(x, y)]$$

A comparison of the measured total edge responses for each of the N discrete directions yields an edge response having the lowest value and thus, the lowest edge intensity. According to the prior art methods of determining blur direction previously described, the direction yielding the lowest edge intensity would be assumed to be the direction in which blurring occurred. However, as mentioned previously, doing so may lead to inaccuracies as the low edge intensity may be the result of edge information in the unblurred image for that direction being scarce, or the result of noise, which may in any particular direction tend to either sharpen or soften edges.

Rather than immediately declaring the direction associated with the lowest edge intensity as the blur direction, according to the present invention, once the total edge response for each of the N discrete directions has been measured, the average total edge response over all of the discrete directions is determined (step 218).

Following step 218, the N discrete directions are then grouped into a first pair of possible subgroups thereby to partition the angular space of the image between [0, π) into a pair of quadrants $Q_1$ and $Q_2$ respectively (step 220) with the constraint that the discrete directions in quadrant $Q_1$ are consecutive. Quadrant $Q_2$ includes the remaining discrete directions. Since the discrete directions in quadrant $Q_1$ are consecutive, the sectors defined by these discrete directions are side-by-side. The quadrants $Q_1$ and $Q_2$ can be expressed as:

$$Q_1 = [\theta_n, \theta_n + \pi/2) \text{ and } Q_2 = [\theta_n + \pi/2, \theta_n + \pi)$$

With the angular space of the image between [0, π) partitioned into the two quadrants $Q_1$ and $Q_2$, the average edge response over the discrete directions in each quadrant is then measured (step 222) according to the equations:

$$\mu_1 = Avg\{E(n), n \in Q_1\} \text{ and } \mu_2 = Avg\{E(n), n \in Q_2\}$$

Using the measured average edge responses for the quadrants $Q_1$ and $Q_2$, the deviation $DEV_n$ between the total edge response over all of the N discrete directions and the total edge response over the discrete directions in each of the quadrants $Q_1$ and $Q_2$ is determined (step 223) according to equation:

$$DEV_n = 0.5 \times (|\mu_1 - \mu| + |\mu_2 - \mu|)$$

Figure 6B:
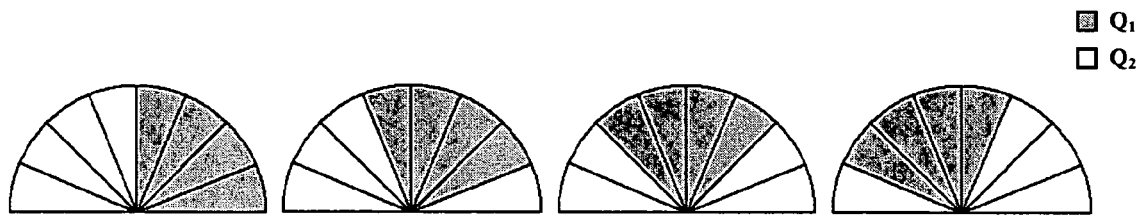
FIG. 6b shows possible groupings of the discrete directions of FIG. 6a into quadrants $Q_1$ and $Q_2$.

The above steps are then performed for each of the other pairs of possible subgroups with the constraint that the discrete directions in quadrant $Q_1$ must be consecutive (step 222). FIG. 6b shows the pairs of possible subgroups for N=8 discrete directions.

Figure 6C:
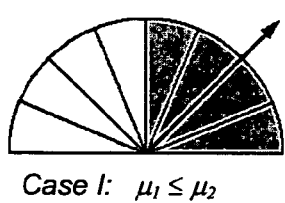
FIG. 6c shows blur direction determination for one of the possible discrete direction groupings of FIG. 6b.
Figure 6C:
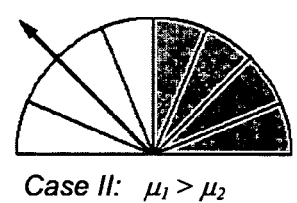

With reference to FIG. 6c, the blur direction is then determined by firstly finding the subgroup combination that yields the maximum value of $DEV_n$ (step 224). For the subgroup combination yielding the maximum value of $DEV_n$, if the measured average edge response $\mu_1$ over the discrete directions in quadrant $Q_1$ is less than or equal to the measured average edge response $\mu_2$ over the discrete directions in quadrant $Q_2$, the direction that bisects quadrant $Q_1$ is declared as the blur direction (step 226). Otherwise, the direction normal to the direction that bisects quadrant $Q_1$ is declared as the blur direction. This is due to the fact that edge responses near the blur direction tend to be weaker due to the blurring.

As will be appreciated, during blur direction determination, the average total edge response over all of the discrete directions and average total edge response over subgroups of the discrete directions are taken into account. By doing this, undesirable effects due to anomalies in a particular direction resulting from noise and/or insufficient edge information are dampened. As a result, the likelihood of declaring an inaccurate blur direction is significantly reduced as compared to prior art blur direction estimation techniques.

Figure 3:
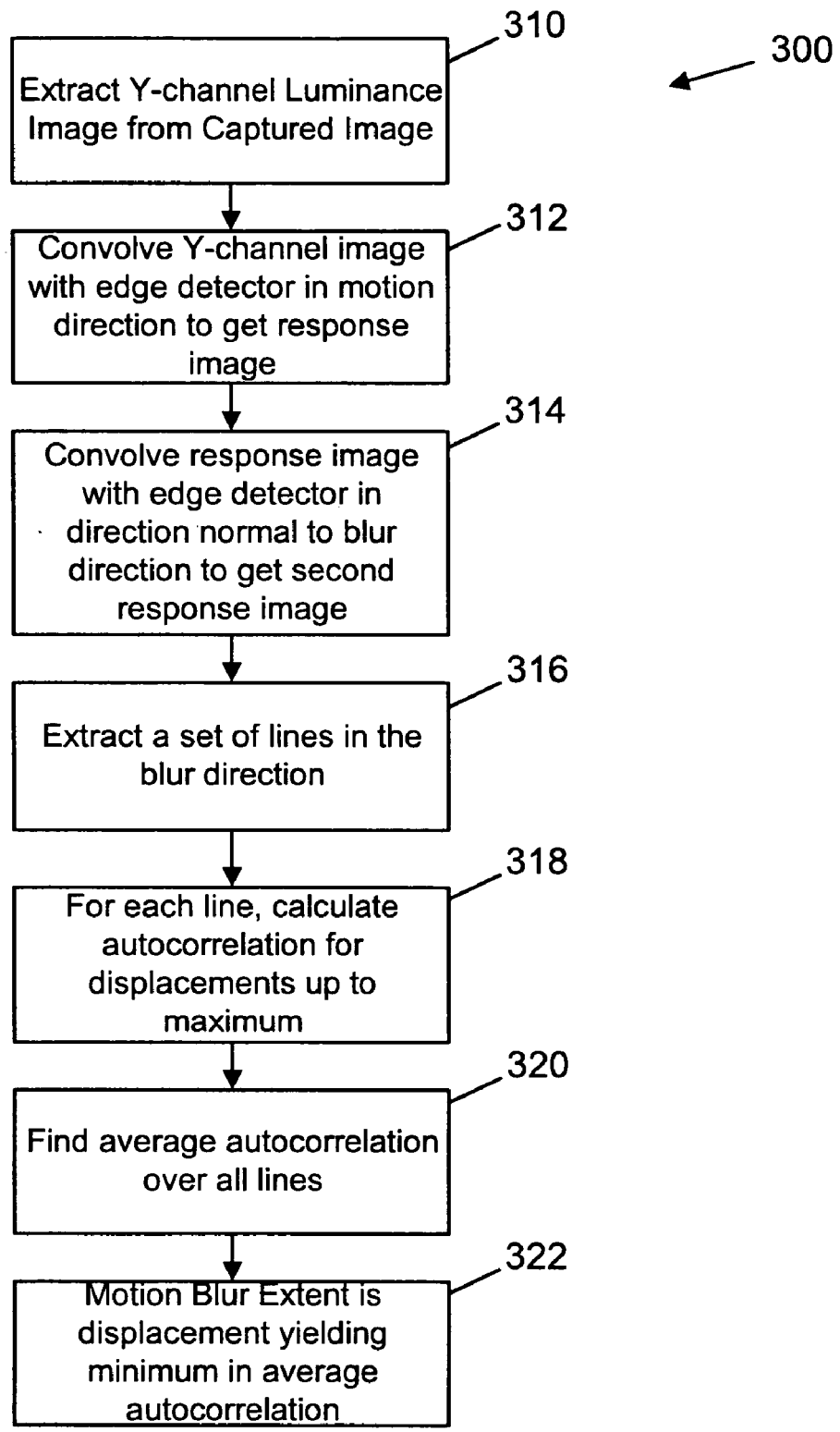
FIG. 3 is a flow chart showing the steps performed during blur extent estimation.

FIG. 3 shows the steps performed during blur extent estimation (step 300). In this embodiment, blur extent estimation is based on a correlation-based method. For the following discussion, motion angle (direction in relation to the horizontal) is denoted as $\theta_m$, and the angle normal to the motion angle $\theta_m$ is denoted as $\theta_{m\perp}$.

Similar to blur direction estimation, during blur extent estimation a Y-channel luminance image l(x,y) is extracted from the captured image (step 310). The extracted image is then convolved with an edge detector in the determined blur direction to yield a response image $R_{\theta m}$ (step 312). The response image $R_{\theta m}$ is then convolved with an edge detector in a direction normal to the determined blur direction to yield a second response image $R_{\theta m,\theta m\perp}$ (step 314). From the second response image $R_{\theta m,\theta m\perp}$, a set of K sampled lines $\{s_1, \ldots, s_K\}$ in the determined blur direction is extracted (step 316).

For each sampled line $s_k$, an autocorrelation is calculated for displacements $\tau=1 \ldots \tau_{max}$ (step 318) according to the autocorrelation function $ACF_k$ given by:

$$ACF_k(\tau) = \sum_{x=0}^{L-1} s_k(x) s_k(x+\tau)$$

where:
$\tau_{max}$ is the maximum extent detected;
L is the length of line $s_k$; and
$s_k(x)=0$ for $x \notin [0, L-1]$.

The average autocorrelation function $\overline{ACF}$ over all sampled lines $s_k(x)$ is then calculated (step 320). Motion blur extent $D_m$ is declared as the displacement that yields the minimum in the average autocorrelation function (step 322) according to the equation:

$$D_m = \arg\min_\tau \{\overline{ACF}(\tau)\} - 1$$

Figure 4:
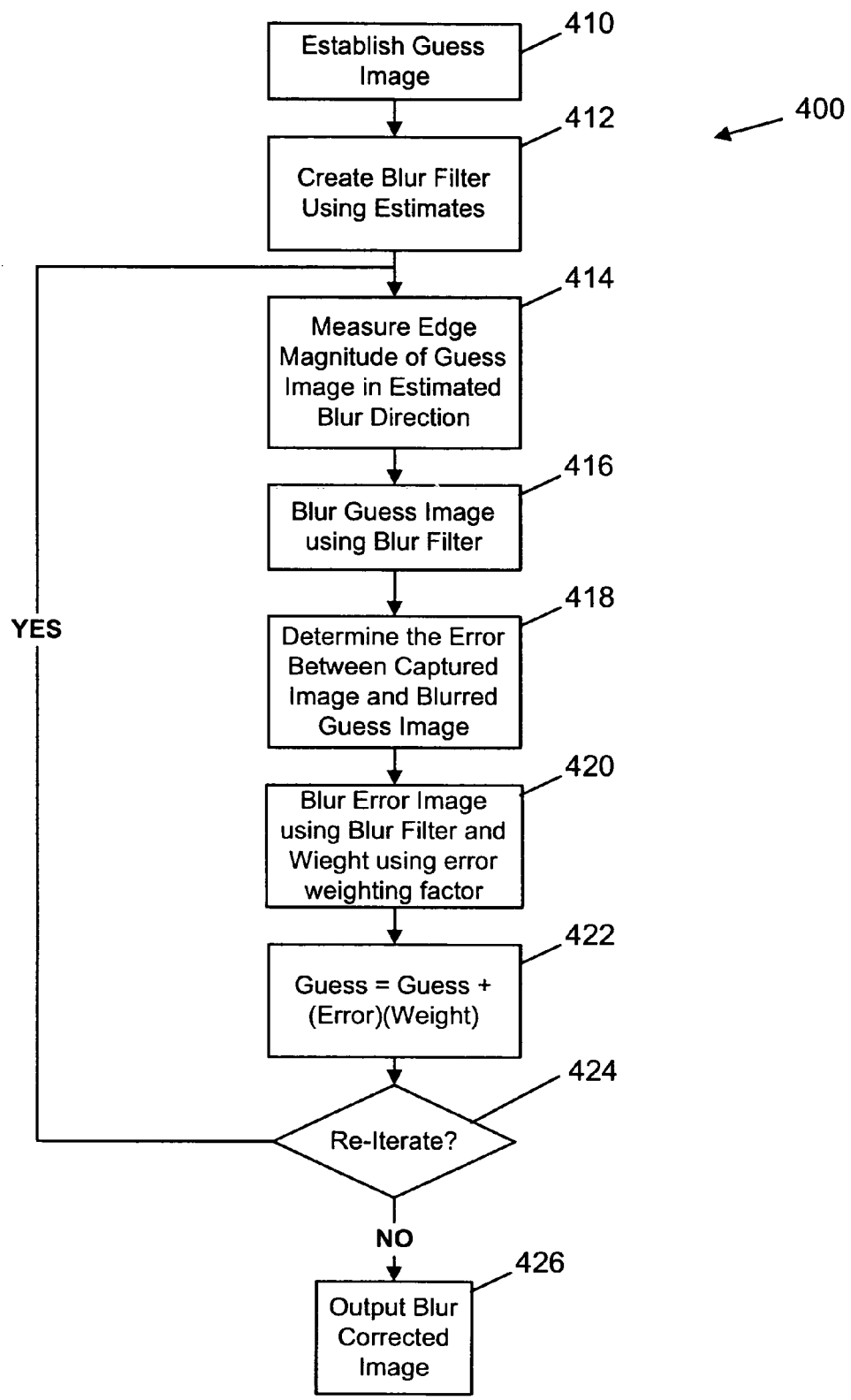
FIG. 4 is a flow chart showing the steps performed during blur correction in a captured image using the estimated blur direction and blur extent.

FIG. 4 shows steps performed for reducing motion blur in a captured image using the estimated blur direction and blur extent thereby to generate a blur corrected image. At step 410, an initial guess image equal to the captured image is established. A motion blur filter is then created based on the estimated blur direction and blur extent (step 412). The edge magnitude of the guess image in the estimated blur direction is calculated using a high-pass filter (step 414) and stored for later use as an error weighting factor to reduce blur correction from being performed in areas of the captured image not requiring blur correction. The guess image is then blurred using the motion blur filter (step 416) and an error image is calculated by finding the difference between the blurred guess image and the captured image (step 418). The error image is then convolved with the motion blur filter and weighted using the error weighting factor (step 420). Following this, the blurred and weighted error image is combined with the guess image thereby to update the guess image (step 422). A check is then made to determine if steps 414 to 422 have been performed a threshold number of times (step 424). If not, steps 414 to 422 are re-performed and the check is made one again. Steps 414 to 422 are performed iteratively until they have been performed the threshold number of times. At this point, the last updated guess image forms the output blur corrected image (step 426).

A directional sharpening filter, tuned to the blur direction, may be applied to the output blur corrected image to enhance the final output.

The following pseudocode illustrates the above-described iterative process. Given the motion blurred image, l(x,y), the blur direction, $\theta_m$, and the blur extent, $D_m$, the blur corrected image, O'(x,y), is generated as follows:

If ($D_m$ is larger than $D_{restore}$)
    Set l(x,y) as the initial guess for O'(x,y).
    For i=1 to MAXITERS:
        measure the edge magnitude factor of O'(x,y) in the motion direction $\theta_m$ and store the results in W(x,y)
        convolve O'(x,y) with a motion blur filter with direction $\theta_m$ and extent $D_m$ to get the blurred image, B(x,y)
        subtract B(x,y) from l(x,y) to get the error image E(x,y)
        convolve E(x,y) with a motion blur filter with direction $\theta_m$ and extent $D_m$
        update the current guess O'(x,y) using the error image, weighted by the edge magnitude factor:

$$O'(x,y)=O'(x,y)+E(x,y) \times W(x,y)$$

End of For Loop
    Apply a directional sharpening filter tuned to angle $\theta_m$ to O(x,y) to produce the sharpened output image.
Else
    Apply a directional sharpening filter tuned to angle $\theta_m$ to l(x,y) to produce the sharpened output image, l(x,y).
End of Correction Algorithm As can be seen from the above pseudocode, blur correction is only performed if the blur extent $D_m$ is larger than a threshold blur extent level $D_{restore}$. The value assigned to the threshold blur extent level $D_{restore}$ is selected to prevent blur correction from proceeding if the blur extent is too small to effect a noticable difference. It can be seen that the number of iterations is set to occur MAXITERS times, where MAXITERS is an integer.

As will be appreciated, during blur correction of the captured image, rather than adjusting each and every pixel in the guess image based solely on the error, the amount of blur incurred on each pixel, determined from the edge magnitude in the blur direction is taken into account.

Also, by taking blur direction into account during blur correction, edges perpendicular to the blur direction are given full correction based on the error, and edges parallel to the blur direction are not corrected. Edges forming intermediate angles with the blur direction are given corresponding corrections with the corrections progressively increasing as the angles increase towards the perpendicular. As will be appreciated by those of skill in the art, edges parallel to the blur direction typically do not require blur correction. Edges forming angles with the blur correction require correction with the amount of correction being a function of the angles. The greater the angle the greater the necessary blur correction. By weighting blur correction using a factor that is based on blur direction, unnecessary correction and overcorrection is reduced. As such, depending on the amount of high-contrast data in the image, ringing due to error when convolved with high contrast structures in the image is reduced because the amount of correction is tuned to the estimated blur direction. Advantageously, reduction of ringing is complementary to the task of blur correction, because edges progressively parallel to the direction of motion require progressively less and less blur correction.

Figure 7:
FIG. 7 shows an original unblurred image, a blurred version of the original image, and two blur corrected images.

FIG. 7 shows an original unblurred image 440, a horizontally blurred version 442 of image 440 and two blur corrected images 444 and 446. As can be seen, horizontal lines in original image 440 such as for example, the top and bottom of the vehicle license plate are not blurred in blurred image 442.

Vertical lines such as for example the sides of the vehicle license plate are blurred the most in blurred image 442. Lines at intermediate angles become progressively blurred as they approach the vertical.

Blur corrected image 444 is the result of 50 iterations of steps 414 to 422 and blur corrected image 446 is the result of 400 iterations of steps 414 to 422. As will be appreciated, in each case the blur corrected image does not suffer from the effects of ringing.

While the embodiment described above utilizes eight discrete directions to divide the angular space of the image, it will be understood that a greater or smaller number of discrete directions may be chosen. Factors influencing finer or coarser discretization of the angular space may include the resolution of the image, the computational power of the device used to perform the blur correction method, the acceptable target user wait time, the amount of correction (resolution) acceptable to the target user, and/or other factors user-set parameters. Choosing an even value for the N discrete directions ensures that the determined blur direction corresponds to one of the discrete directions. The value for N can however be odd although this may result in less accurate blur direction determination.

It will be understood that while the steps 414 to 422 are described as being executed a threshold number of times, the iteration process may proceed until the magnitude of the error between the captured image and the blurred guess image falls below a threshold level, or fails to change in a subsequent iteration by more than a threshold amount. The number of iterations may alternatively be based on other equally-indicative criteria.

It will also be apparent to one of ordinary skill in the art that other suitable edge detectors/high-pass filters may be used to measure blurring and edge magnitudes.

The present invention can be embodied in a software application executed by a processing unit such as a personal computer or the like. The software application may run as a stand-alone digital image editing tool or may be incorporated into other available digital image editing applications to provide enhanced functionality to those digital image editing applications.

The present invention can also be embodied as computer readable program code stored on a computer readable medium. The computer readable medium is any data storage device that can store data, which can thereafter be read by a computer system. Examples of computer readable medium include read-only memory, random-access memory, CD-ROMs, magnetic tape and optical data storage devices. The computer readable program code can also be distributed over a network including coupled computer systems so that the computer readable program code is stored and executed in a distributed fashion.

Although embodiments of the present invention have been described, those of skill in the art will appreciate that variations and modifications may be made without departing from the spirit and scope thereof as defined by the appended claims.

What is claimed is:

1. A method of correcting blur in a motion blurred image comprising:
   estimating the direction of blur in said motion blurred image based on edge response of said motion blurred image over a set of discrete directions extending through said motion blurred image and over subgroups of said discrete directions;
   estimating the extent of blur in said motion blurred image;
   generating an initial guess image based on said motion blurred image;
   blurring the guess image as a function of said estimated blur direction and blur extent;
   comparing the blurred guess image with the motion blurred image to generate an error image;
   blurring the error image; and
   combining the error image and the initial guess image thereby to update the guess image and correct for blur in the guess image; and
   further comprising weighting said error image prior to said combining to inhibit blur correction from occurring in areas not requiring blur correction;
   wherein said weighting is a function of the blur direction;
   wherein said weighting is an estimate of the edge magnitude of said guess image in said blur direction;
   wherein said blurring, comparing, blurring, weighting, and combining are performed iteratively;
   wherein said set of discrete directions includes N discrete directions, said discrete directions being angularly spaced over the angular space of said motion blurred image between 0 and 180 degrees;
   wherein said discrete directions are equi-angularly spaced and wherein N is an even number;
   wherein during said blur direction estimating the edge response over a plurality of subgroup combinations of discrete directions is determined and compared with the edge response over the set of discrete directions, each subgroup combination partitioning said set of discrete directions into a pair of quadrants; with discrete directions in at least one of said quadrants being consecutive; and
   wherein said blur direction estimating further comprises:
   for each subgroup combination, determining the deviation between the edge response of said motion blurred image over said set of discrete directions and the edge responses of said motion blurred image over the discrete directions in each of said quadrants;
   for the subgroup combination yielding the highest deviation declaring the direction that bisects the one quadrant as the blur direction when the edge response over the discrete directions in the one quadrant is less than the edge response over the discrete directions in the other quadrant; and
   otherwise declaring the direction normal to the direction that bisects the one quadrant as the blur direction.

2. A method of correcting blur in a motion blurred image comprising:
   estimating the direction of blur in said motion blurred image based on edge response of said motion blurred image over a set of discrete directions extending through said motion blurred image and over subgroups of said discrete directions;
   estimating the extent of blur in said motion blurred image;
   generating an initial guess image based on said motion blurred image;
   blurring the guess image as a function of said estimated blur direction and blur extent;
   comparing the blurred guess image with the motion blurred image to generate an error image;
   blurring the error image; and
   combining the error image and the initial guess image thereby to update the guess image and correct for blur in the guess image;
   wherein said set of discrete directions includes N discrete directions, said discrete directions being angularly spaced over the angular space of said motion blurred image between 0 and 180 degrees;

wherein said discrete directions are equi-angularly spaced and wherein N is an even number;

wherein during said blur direction estimating the edge response over a plurality of subgroup combinations of discrete directions is determined and compared with the edge response over the set of discrete directions, each subgroup combination partitioning said set of discrete directions into a pair of quadrants, with discrete directions in at least one of said quadrants being consecutive; and wherein said blur direction estimating further comprises:

for each subgroup combination, determining the deviation between the edge response of said motion blurred image over said set of discrete directions and the edge responses of said motion blurred image over the discrete directions in each of said quadrants;

for the subgroup combination yielding the highest deviation, declaring the direction that bisects the one quadrant as the blur direction when the edge response over the discrete directions in the one quadrant is less than the edge response over the discrete directions in the other quadrant; and otherwise declaring the direction normal to the direction that bisects the one quadrant as the blur direction.

3. The method of claim 1 wherein the edge magnitude is estimated using a high-pass filter.

4. The method of claim 1 wherein said initial guess image is said motion blurred image.

5. The method of claim 1 wherein said blurring, comparing, blurring, weighting, and combining are performed iteratively a threshold number of times.

6. The method of claim 1 wherein said blurring, comparing, blurring, weighting, and combining are performed iteratively until the magnitude of the error image falls below a threshold level.

7. The method of claim 1 wherein said blurring, comparing, blurring, weighting, and combining are performed iteratively until the error image fails to change by more than a threshold amount between successive iterations.

8. The method of claim 1 wherein prior to said generating said blur extent is compared with a threshold blur extent level, said generating, blurring, comparing, blurring, weighting and combining being performed only when the estimate of the motion blur extent is greater than said threshold blur extent level.

9. The method of claim 1, wherein said blur extent is estimated using a correlation based method.

10. The method of claim 1, wherein said blur extent is estimated using a correlation based method.

* * * * *

UNITED STATES PATENT AND TRADEMARK OFFICE
CERTIFICATE OF CORRECTION

PATENT NO. : 7,561,186 B2 Page 1 of 1
APPLICATION NO. : 10/827394
DATED : July 14, 2009
INVENTOR(S) : Eunice Poon It is certified that error appears in the above-identified patent and that said Letters Patent is hereby corrected as shown below:

Column 12

Line 24, please change "The method of claim 1" to --The method of claim 2--.

Signed and Sealed this

Eighth Day of September, 2009

David J. Kappos
*Director of the United States Patent and Trademark Office*